(12) United States Patent
Elrod et al.

(10) Patent No.: US 7,281,675 B2
(45) Date of Patent: Oct. 16, 2007

(54) PORTABLE PARTICLE SPREADER/BLOWER

(76) Inventors: Marcos Elrod, 1367 E. 72$^{nd}$ St., Brooklyn, NY (US) 11234; Michael Glater, 1372 E. 72$^{nd}$ St., Brooklyn, NY (US) 11234

( * ) Notice: Subject to any disclaimer, the term of this patent is extended or adjusted under 35 U.S.C. 154(b) by 177 days.

(21) Appl. No.: 11/203,881

(22) Filed: Aug. 15, 2005

(65) Prior Publication Data

US 2007/0034710 A1    Feb. 15, 2007

(51) Int. Cl.
*A01C 3/00* (2006.01)
*A01C 7/00* (2006.01)
*A01C 15/00* (2006.01)
*A01C 19/00* (2006.01)
*E01C 19/20* (2006.01)

(52) U.S. Cl. ............... 239/663; 239/650; 239/653; 239/99; 239/677

(58) Field of Classification Search ............ 239/650, 239/653, 658, 336, 664, 668, 669, 676, 677, 239/99, 102.1, 142, 144, 195
See application file for complete search history.

(56) References Cited

U.S. PATENT DOCUMENTS

| 236,640 | A | | 1/1881 | Speicher | |
|---|---|---|---|---|---|
| 275,590 | A | | 4/1883 | Clark | |
| 1,166,476 | A | | 4/1916 | Parrish | |
| 2,740,230 | A | * | 4/1956 | Clapper | ............... 239/654 |
| 3,157,403 | A | * | 11/1964 | Van Der Lely | ............ 239/665 |
| 3,979,071 | A | | 9/1976 | Biggs, Jr. | |
| 3,993,225 | A | | 11/1976 | Manni | |
| 4,071,170 | A | | 1/1978 | Gunzel, Jr. | |
| 4,469,210 | A | * | 9/1984 | Blumer et al. | ............... 193/22 |
| 4,991,781 | A | | 2/1991 | Barbieri | |
| 5,054,693 | A | | 10/1991 | Chow | |
| 5,119,993 | A | * | 6/1992 | Gunzel et al. | ............... 239/654 |
| 5,429,305 | A | * | 7/1995 | Munsey | ............... 239/152 |
| 5,584,436 | A | * | 12/1996 | Sepke | ............... 239/154 |
| 5,794,864 | A | * | 8/1998 | Hammett et al. | ............... 241/56 |
| 5,934,573 | A | * | 8/1999 | Weterrings et al. | ......... 239/650 |
| 5,944,264 | A | * | 8/1999 | Truax et al. | ............... 239/653 |
| 6,024,294 | A | | 2/2000 | Dillon | |

(Continued)

*Primary Examiner*—Kevin Shaver
*Assistant Examiner*—James S. Hogan
(74) *Attorney, Agent, or Firm*—George J. Brandt, Jr.

(57) ABSTRACT

A portable, user shoulder supported spreader/blower unit includes an ergonomically configured housing which includes a section defining a storage bin for holding a quantity of salt or like chemical particulate material for spreading onto ground surfaces to prevent icing thereon in winter. A centrifugal distributor disk is located in a housing space section below the bin and, a bin discharge aperture aligns over a peripheral area of the distributor disk. A user controllable closure member selectively alters bin discharge aperture size and, hence, outflow quantity from the bin onto the distributor disk, the distributor disk rotating at high speed propelling particulate material out of the housing through a discharge nozzle thereon at a high speed. e.g., 60 m/sec when the unit is user in a spreader mode. To further enhance carry of the particulate material from the housing, a fan impeller mounted in the housing in the common space wherein the distributor disk operates, is rotated at high speed to produce air flow supplementing energy imparted to the particulate material. When the unit is used in a blower mode such as in a leaf collection operation, high pressure air from an outside source can be introduced into the unit so the airstream discharge from the unit is optimized to that required for leaf blowing.

**

U.S. PATENT DOCUMENTS 6,092,260 A      7/2000   Kai
6,637,678 B2 *  10/2003   Wyne .......................... 239/663
6,840,468 B2 *   1/2005   Barnett ....................... 239/654
7,104,478 B2 *   9/2006   Niemela et al. ............ 239/672
2006/0016918 A1 *   1/2006   Sagol et al. ................ 239/653

* cited by examiner

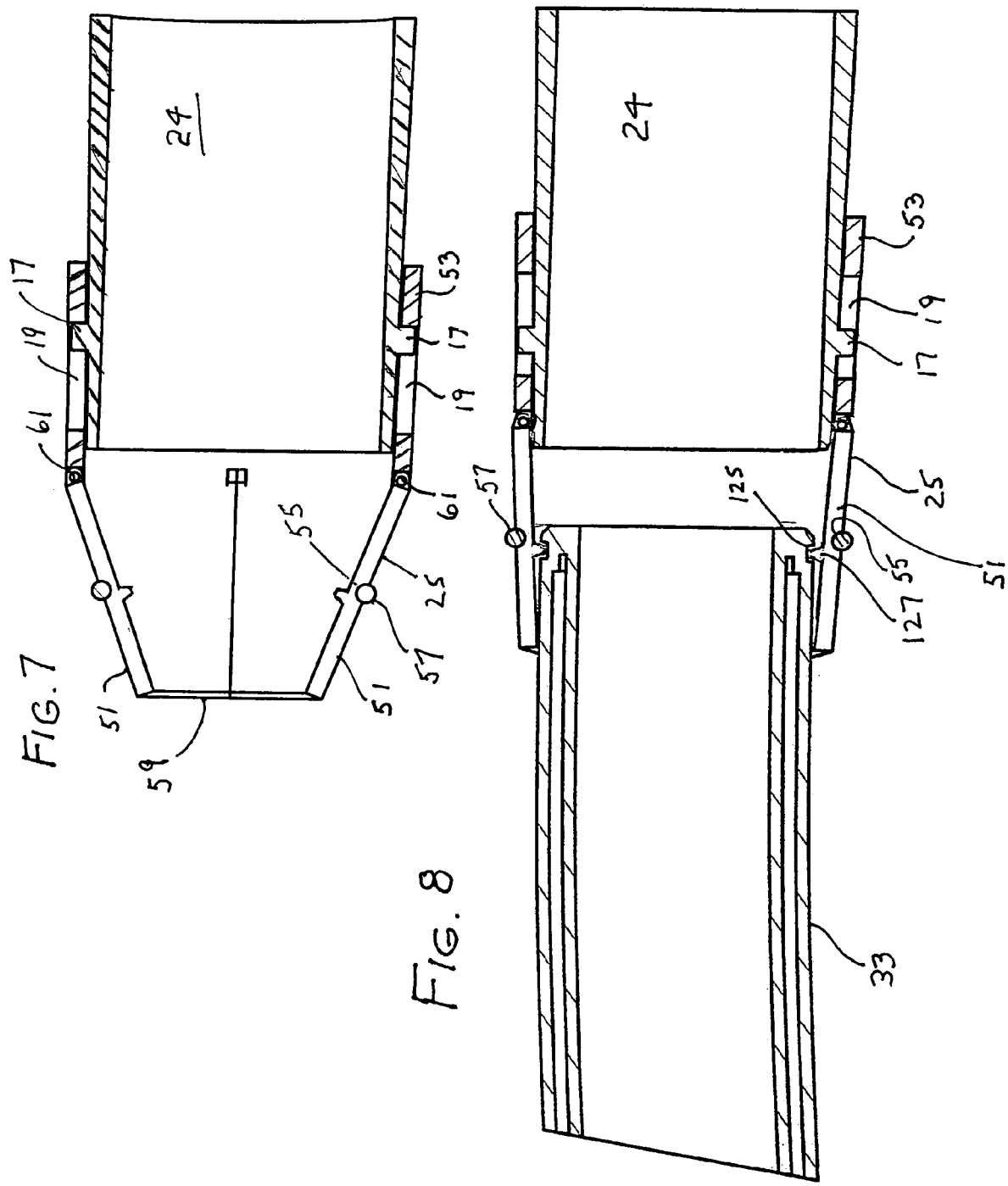

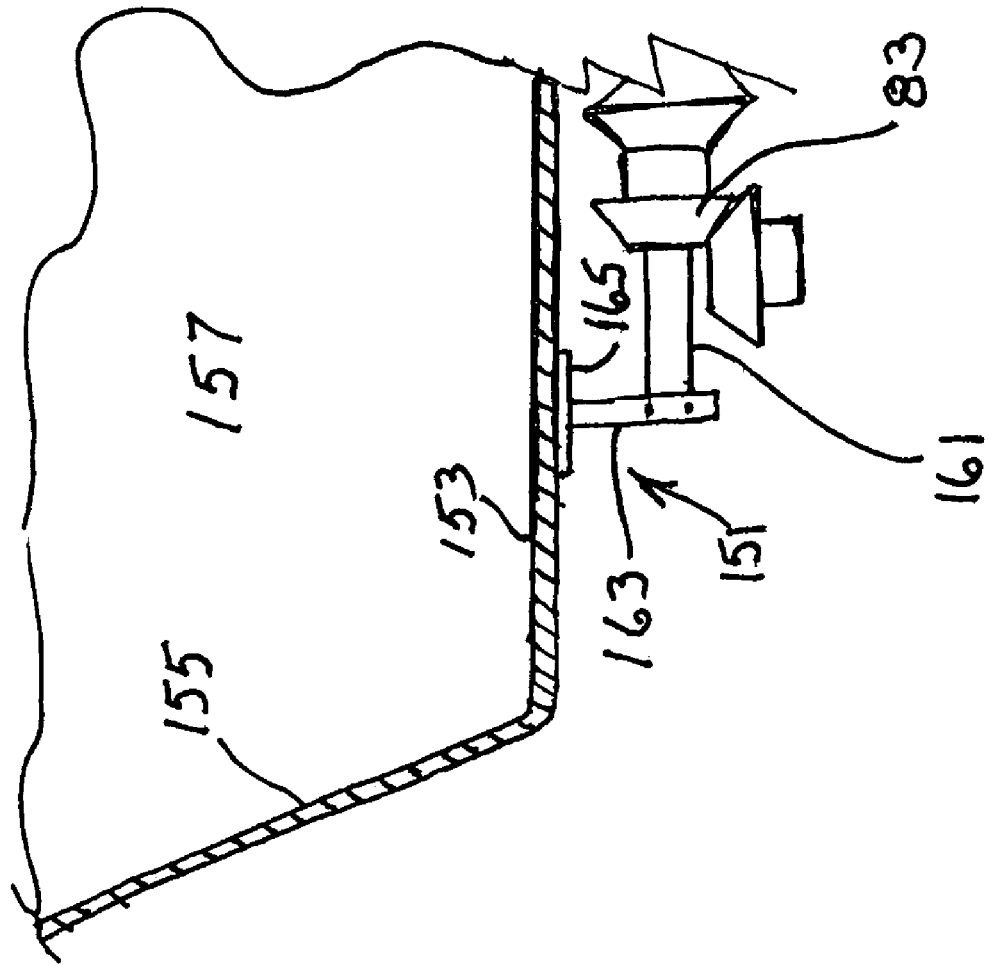

PORTABLE PARTICLE SPREADER/BLOWER

BACKGROUND OF INVENTION

Labor savings devices for homeowners and do it yourself individuals faced with performing arduous chores, enjoy growing popularity and steady development of improved forms of such devices. Exemplary of such devices are those which can be employed adjunct a home or property owner need to collect leaves in the Autumn by blowing rather than raking, or following snow removal to salt sidewalks, driveways etc to prevent icing of such surfaces.

Portable particle spreader units for are known as are portable leaf blower units. Some spreader units are intended to be carried and set down by the user at a selected location. The user then operates the unit to spread salt over an area. The unit is then moved to another location and operated to spread salt over a second area, this procedure being repeated as necessary until the whole area to be salted is covered. Some known spreader units and blower units are mounted on wheels and can be operated to spread salt or blow leaves as the user pushes the unit over areas to be salted or leaf blown. Some spreaders and leaf blowers are designed to be supported on the user's body.

The foregoing described spreader/blower types have the disadvantages of being cumbersome to use if the unit is one operating from a stationary position since it must repeatedly be moved to new locations to complete a spreading or blowing job. Spreader/blower types mounted on wheels involve user need to use one hand for propelling the unit. This leaves the user at a disadvantages where a requirement for using both hands during spreading or blowing arises since he must stop the travel movement of the unit to deal with the requirement. For example, a user may need to alter a spreader unit particle feed rate while directing a spreading tube in a desired direction. Such would require stopping the pushing of the unit at least for a short interval. Some body supported units employed as spreaders are more bulky than need be and in some cases have exposed moving parts that could be a hazard to the user.

It is desirable that a more compact user carried spreader/blower unit useable during the Autumn season for leaf collection, and in the Winter season for deicing and ice formation prevention be provided. The unit should be of ergonomically compact configuration easily side carried on a user's shoulder with an adjustable shoulder strap. In this way fatiguing load on the user's arm is minimized whether he be in standing, squatting or bending positions. All operating mechanisms should be carried in a smooth housing to assure user protection and facilitate user unencumbered sight of areas being worked. Further, the unit should be designed to minimize weight and in the case of a spreader operation, carry a modest quantity of salt or chemical so as to not unduly burden the user.

OBJECTS AND SUMMARY OF THE INVENTION

Accordingly, an object of the invention is to provide a portable spreader/blower which overcomes the drawbacks of the prior art.

Another object is to provide a portable spreader/blower which is compact, lightweight and of user friendly ergonomic configuration thereby allowing convenient, comfortable and efficient use for its intended purpose.

A further object is to provide a portable spreader/blower of simplified construction facilitating simple and relatively low cost manufacturing of same.

Another object is to provide a portable spreader/blower which is particularly suited for user shoulder supporting of the spreader/blower when operating same, A still further object is to provide a portable spreader/blower in which both a rotary disk imparted momentum and that of a high speed airstream flow can be employed to maximize throw onto a ground surface area of particles when the unit is employed in a spreader mode.

Another object is to provide a portable spreader/blower which allows for use therewith of spreading material loadable into a storage bin of the unit in pre-packaged quantities of such material.

Another object is to provide a portable spreader/blower which in blower mode can employ in addition to a fan impeller generating a high speed airsteam flow, a blower outlet flow of high pressure air introduced to the unit from a separate outside source.

Briefly stated, there is provided a portable spreader/blower unit which includes an ergonomically configured housing, the housing having a section or part thereof defining a storage bin for holding a quantity of a particulate material such as salt to be spread in spreader mode, on ground surfaces to prevent icing thereof. Within the housing, a centrifugal distributor disk is rotatably mounted below the bin. A bin discharge aperture aligns with a face area part of the distributor disk so that with the disk rotating and material falling thereon from the storage bin, the material is accelerated into a stream flow form which is directed to and outwardly from a housing discharge nozzle. A material spread quantity can be user controlled with a closure member selectively movable to close off more or less of the bin discharge aperture. A fan impeller is mounted in the housing region below the storage bin and can be operated to generate an airstream which can be directed to commingle with and further accelerate material stream flow so that said stream flow enhances the throw of the material outwardly from the housing nozzle. When the unit is used in a blower mode such as in a leaf collection operation, high pressure air from an outside source can be introduced into the unit so the airstream discharge from the unit is optimized to that required for leaf blowing.

In accordance with these and other objects of the invention, there is provided a portable spreader/blower unit which includes a housing enclosure, the housing enclosure having a bin section for holding a particulate form material such as salt or chemical material to be spread. A housing discharge nozzle from whence issues an airstream discharge is fitted at a tip end of a housing discharge tube. In an enclosure space region below said bin section, a centrifugal distributor disk having a number of vanes extending up from a face of the disk is rotatably mounted in the housing. A bin section outflow aperture is located above and over a face area part of the distributor disk so that material discharging from the bin through said aperture will fall onto the distributor disk. A closure member is provided for selectively altering effective bin outflow aperture size from a zero opening to a full opening size. Means are provided for rotating the distributor disk, and a shroud encases the distributor disk. The shroud has an outlet which is in communication with the discharge nozzle so that material falling onto the rotating distributor disk is propelled therefrom by the disk vanes and out of the housing through the discharge nozzle. The closure member can be a sliding plate movable to any one of a number of selected positions between full material outflow and no material outflow positions thereby to correspondingly control the quantity of material being spread.

To assure and direct particulate material flow downwardly from the bin to the face area part of the distributor disk, a flow guide tube is provided extending downwardly from the bin outlet aperture to a location proximal said disk face area part. In a convenient form, the flow guide tube can be of a funnel configuration.

A material crushing means such as a rotary screw crusher can be disposed at an entry section length of the flow guide tube to crush any agglomerated mass of material present in the material outflow from the bin. Additionally, bin vibrator means can be provided to produce a vibration in the bin effective to minimize any tendency for particulate material to agglomerate and/or bridge at the bin outlet aperture, as well as to impart travel of the material toward the outlet opening.

A feature provides that a fan impeller also is rotatably mounted in the space region below the bin. Rotation of the fan impeller produces an airstream flow in said space region which because the said space region is in communication with the discharge nozzle results in the airstream having outlet from the housing in company with any material propelled therefrom to increase the momentum in the material and, hence, the throw of the material being spread. A common drive source such as an electric motor can be used to drive both the distributor disk and the fan impeller. A further feature allows that drive to the fan impeller is through a clutch unit which engages and disengages drive to the fan impeller such that use of airstream momentum as a supplement to distributor disk action is optional to the user.

Since salt and chemical deicing particulates can be obtained in readily opened packages, a slitter knife is slidably mounted in the housing and employed to slit open a particulate material package inserted in the bin. In such manner the, e.g., homeowner, can maintain a stock of salt in a residence where it remains in dry particulate form facilitating most effective immediate use of material when required. Access to the storage bin is provided with a cover hinged at the top of the housing. A cut out switch can be included in the housing so that the drive means in the housing are not operable whenever the cover is in open position.

Support clips for receiving a support belt by means of which a user carries the spreader in use, are fitted at both the front and rear sides of the housing.

When the unit is to operated in a blower mode, the fan impeller will be operated to generate an airstream outflow from the nozzle. When a blowing operation will require very high velocity airstream flow such as in the case of blowing leaves, the unit can be connected with an outside source of high pressure air such as a portable air pressure tank by means of an air hose. For such connection, the housing is fitted with a quick connect/disconnect hose connector fitting. The fitting is located to allow high pressure air inlet to the housing airstream course immediately on entry of the high pressure air to the housing.

The drive for the distributor disk and the fan impeller advantageously is a D.C. electric motor powered with a rechargeable battery, both components being unobtrusively carried in the housing. For recharging the battery, a recharging connector is fitted to the housing so that an electric power supply line can be connected to the housing for recharge of the battery.

The above, and other objects, features and advantages of the invention will become apparent from the following description read in conjunction with the accompanying drawings, in which like reference numerals designate the same elements.

BRIEF DESCRIPTION OF THE DRAWINGS

FIG. 7 is a fragmentary longitudinal sectional view of the discharge nozzle depicting how it is slidably captively mounted to a terminal end part of the discharge tube extending out from the housing, the discharge nozzle orifice diameter being at a minimum;

FIG. 8 is a fragmentary longitudinal section view depicting how the nozzle extension piece is removably connected to the discharge nozzle, and FIG. 9 is a fragmentary vertical section of a portion of the housing bin showing a vibrating member which is used to produce vibration in the bin base and bin side walls to therewith promote proper particulate material flow in the bin to a location at which particulates outlet from the bin.

DETAILED DESCRIPTION OF THE PREFERRED EMBODIMENT

Figure 1:
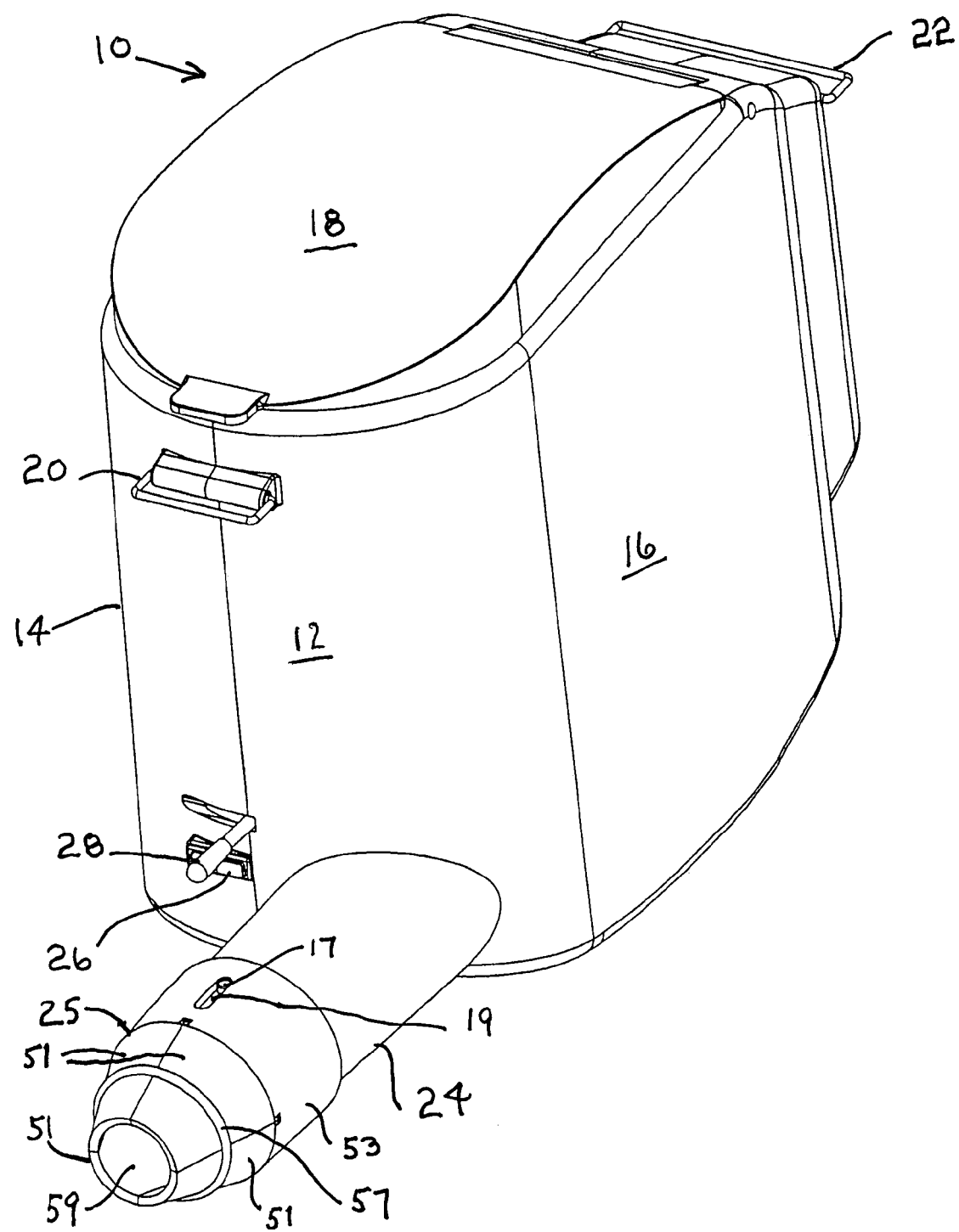
FIG. 1 is top left side perspective view of the portable spreader/blower of the invention, the cover overlaying the salt bin being in closed position.
Figure 2:
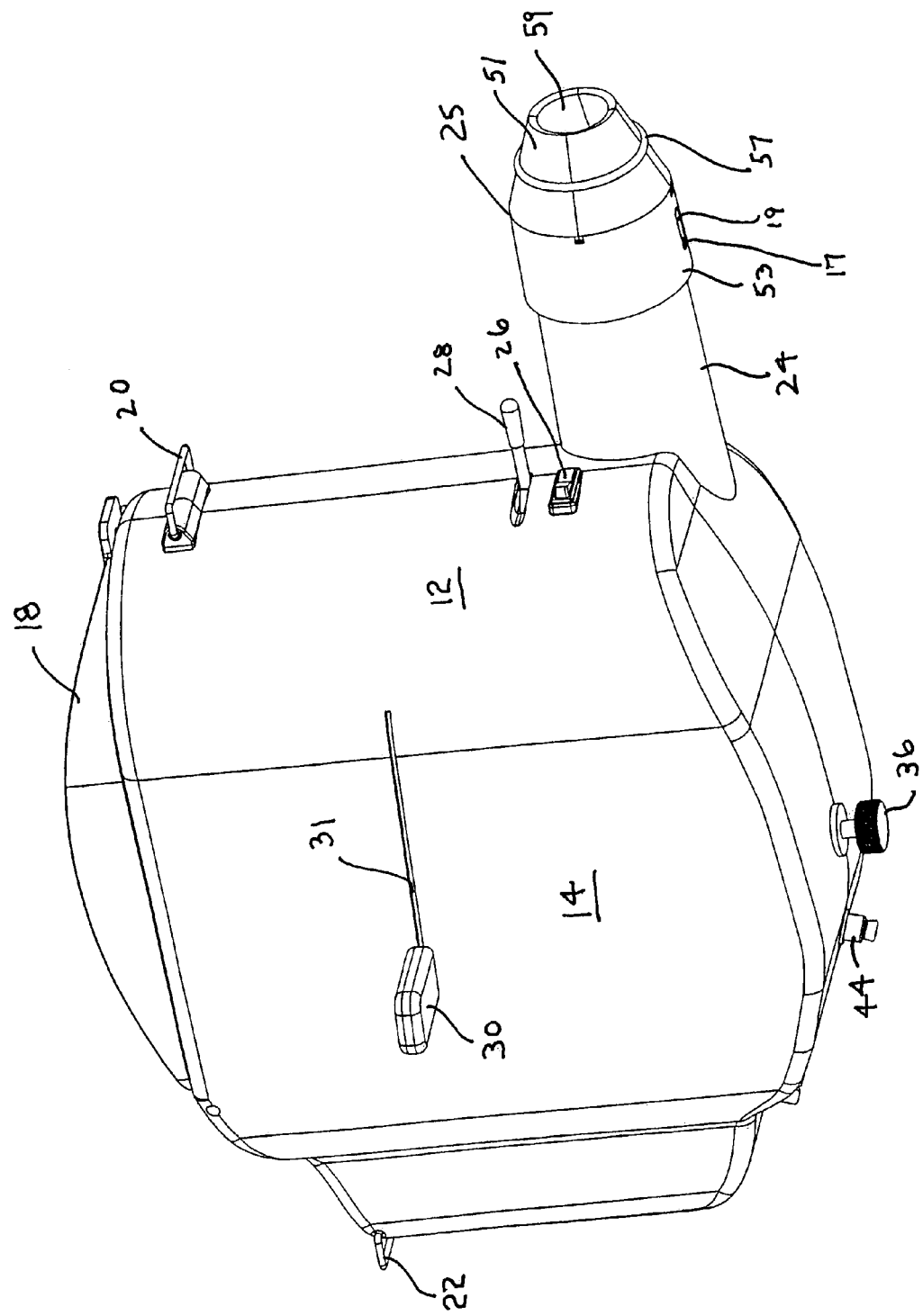
FIG. 2 is a right side eye level perspective view of the portable spreader/blower, the housing cover being closed.

The portable spreader/blower unit is a home and life improvement machine. It eliminates the hard work involved in a home or small business owner manually spreading salt on multi level surfaces, or having to depend on contractors when time comes to blown fallen leaves. Referring now to the drawings and particulary FIGS. 1 and 2, the portable spreader/blower unit 10 has a smooth, ergonomic shape configured to facilitate user comfort and convenience in carrying the spreader while employing same in a mode for spreading particulate material, especially salt, to prevent ground surface icing, or in a blower mode for blowing fallen leaves. The spreader/blower 10 includes a housing enclosure 12 comprised of right and left side housing parts 14,16. A top opening of the housing enclosure 12 is closed over with a housing cover 18 (FIG. 3) which is pivoted to a rear upper part of the enclosure.

The user will best carry the spreader by shoulder supporting same using a support strap (not shown) connected to the housing enclosure 12 at respective front and rear strap clips 20,22 carried on the enclosure for such purpose.

Extending frontally from a left front side part of the housing enclosure 12 is a discharge tube 24, a tip end of which is fitted with a discharge nozzle 25 from which issue of an airstream occurs. In a unit spreader operation mode, a particulate material such as salt will be entrained in the airstream. In a blower operation mode, the airstream will be a high speed air flow. The discharge nozzle 25 is captively, slidably mounted on the discharge tube for limited movement axially on the discharge tube, details of the nozzle structure are depicted in FIG. 7.

The capture of the discharge nozzle 25 is effected with pin 17 fixed to the discharge tube 24 and received in the slot 19 formed in the rear body part 53 of the nozzle 25. Second ones of pin 17 and slot 19 are reciprocally located on the discharge tube 24 and discharge nozzle 25. Sliding the nozzle 25 forwardly on the discharge 24 tube will lessen the area of nozzle discharge aperture 59 so that the velocity of the airstream will be increased. Referring to FIG. 7, the discharge nozzle 25 is comprised of four segments 51 each pivoted as at 61 to rear body part 53. The outer surface of each segment 51 is grooved as at 55. A tension spring 57 encircles the segments and fits into the groove 55 of each segment 51. FIG. 7 shows the structure at the rear end of slots 19 abutting with pins 17 so that the nozzle 25 is at a forward most location on the discharge tube 24 and action of spring 57 pivots segments 51 inwardly toward each other reducing the size of aperture 59. When the discharge nozzle 25 is slid rearwardly on the discharge tube 24, the segments 51 can pass onto the outer surface of the discharge tube 24 and this action will counter pivot the segments 51 with the effect of enlarging the size of aperture 59 and reducing airstream velocity. Maximum aperture size will be when the structure at the front end of slots 19 abut with pins 17.

FIG. 8 shows nozzle extension piece 33, which is a flexible hose member. The extension piece 33 is removably connectable to nozzle 25. To effect this connection, the nozzle 25 is slid rearwardly on nozzle tube 24 so that segments 51 widen. A tip end of the extension piece 33 is the inserted in the nozzle opening defined by the widened segments. The extension piece has an external annular groove 125 proximal the tip end. During the aforementioned insertion, an internal annular bead 127 on the inner surfaces of the segments 51 will detent enter groove 125 under the closing urgency of the segments induced by the action of tension spring 57. Such bead/groove engagement will hold the extension piece securely on the nozzle. To remove the extension piece, it is only necessary to slide the nozzle rearwardly or pull the extension piece forwardly to effect detent release of the bead/groove engagement.

Spreader/blower operation can be initiated with a start-stop button 26 located at a center front position on the housing. When operating in spreader mode, a control lever 28 can be used to alter a quantity flow rate of salt or chemical being spread. Further details of the control lever and how it functions will be given later below.

For spreader mode operation, it is contemplated that salt or deicer chemical used with the unit can be introduced to the unit in a number of forms. One expedient is to simply pour salt or chemical into storage bin 34. Another expedient is to use salt or chemical contained in sealed package form such as in a heavy paper or plastic material wrapper. In such case and with reference to FIGS. 2 and 3, at the right side of the housing is a lever 30 (operating in housing slot 31) attached to a sliding slitter member 32 (FIG. 5) for slitting open a package of, e.g., salt disposed in storage bin 34 (FIG. 4) defined in the housing enclosure 12. The cutting member is a sharp knife piece 42 attached to an upper run side of an endless carrier belt 101. Lever 30 is attached to a lower run side of carrier belt 101. When lever 30 is pushed to the front end of the slot 31, the knife piece 42 is carried rearwardly and in such travel slices through the wrapper freeing the salt or chemical to flow in the bin. Lever 30 is pushed forward in slot 31 against a bias action of a tension spring 102. At the end of the slitting stroke, the lever 30 is returned to rear end of slot 31 by the action of spring 102.

Figure 5:
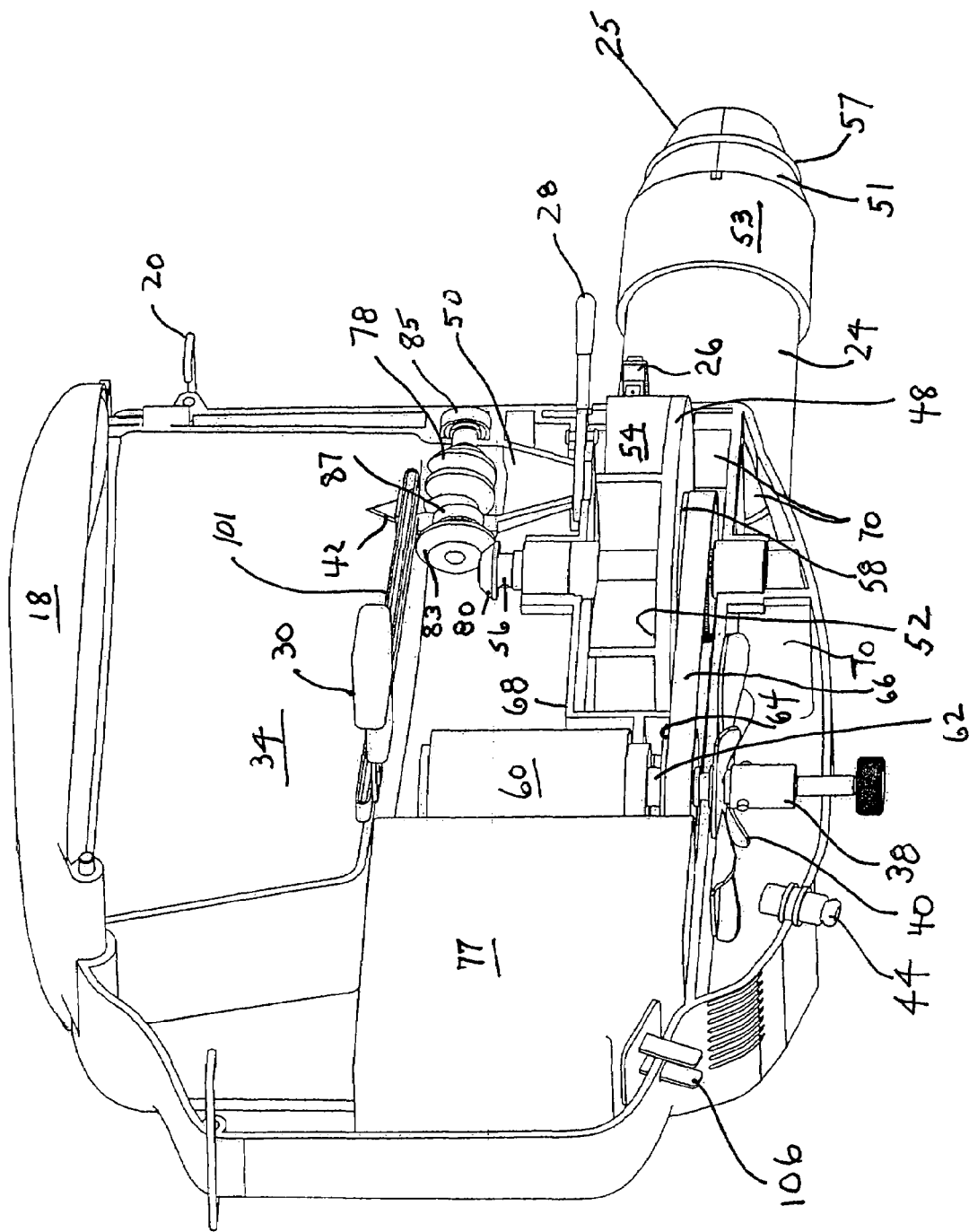
FIG. 5 is a bottom right side perspective view of the portable spreader/blower showing other constructional detail, the right side of the housing being removed.

At the bottom of the housing enclosure 12, a control knob 36 extends outwardly therefrom for the user engaging and disengaging a clutch unit 38 (FIG. 5) employed to connect/disconnect a fan impeller 40 with a drive means (FIG. 5). The housing bottom also includes a quick connect fitting 44 by means of which air under pressure can be admitted to the housing enclosure from an outside compressed air source such as a portable tank to therewith blow an air entrained material out of the discharge nozzle in a spreading material outflow to a surface to be treated. In a blower operation mode, high pressure air can be admitted to enhance leaf blowing. Use of outside source air can in some cases be the only airstream producer since it can be effective for leaf blowing purpose alone. An advantage is that it allows shut down of electric powered air impeller 40 and a rotary distributor disk 48 in the unit thereby conserving the power in the storage battery power source used to operate these components.

Figure 3:
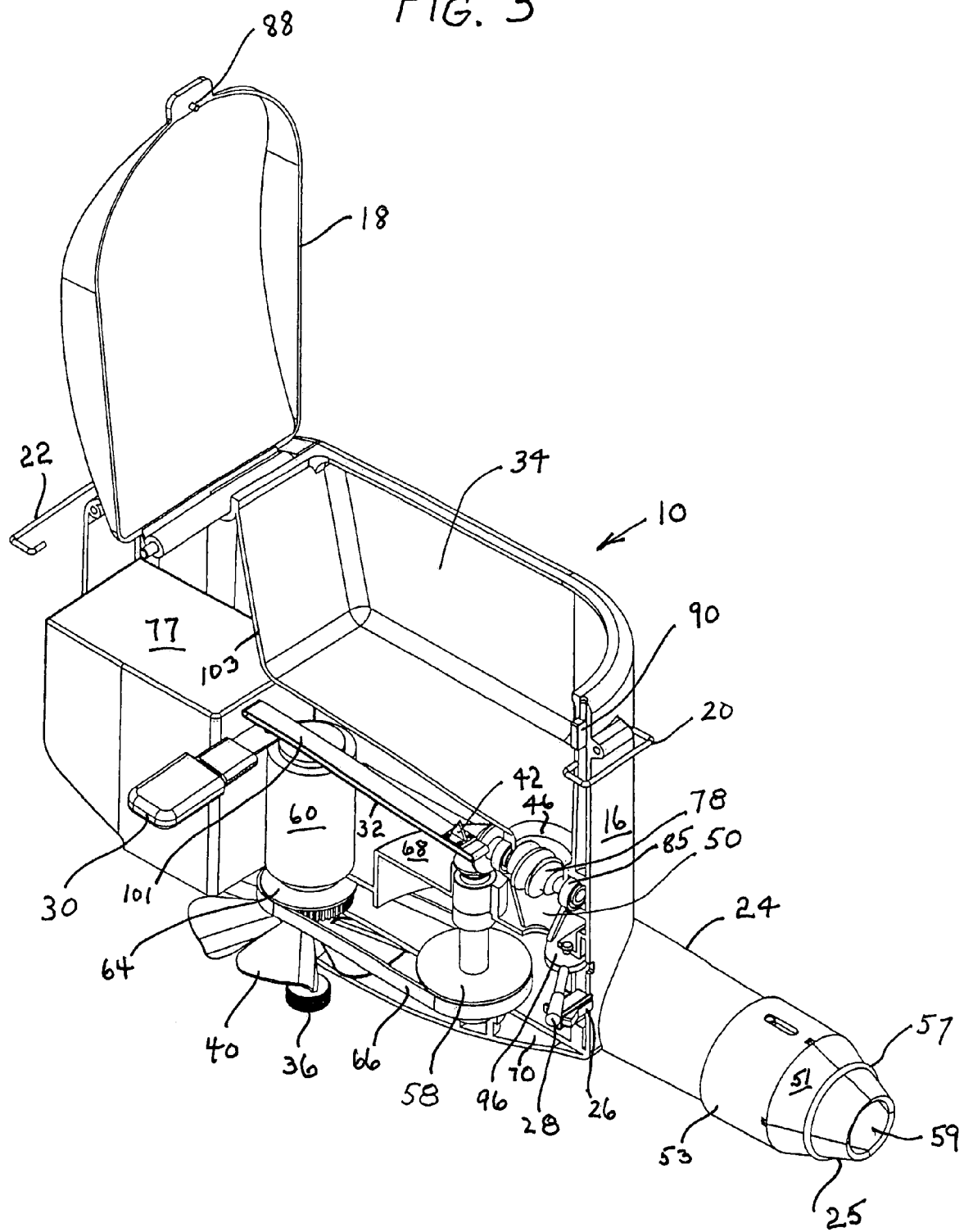
FIG. 3 is a top right side perspective view of the portable spreader/blower, the right half side of the housing being removed, the bin cover being open and the centrifugal distributing disk not been depicted.
Figure 4:
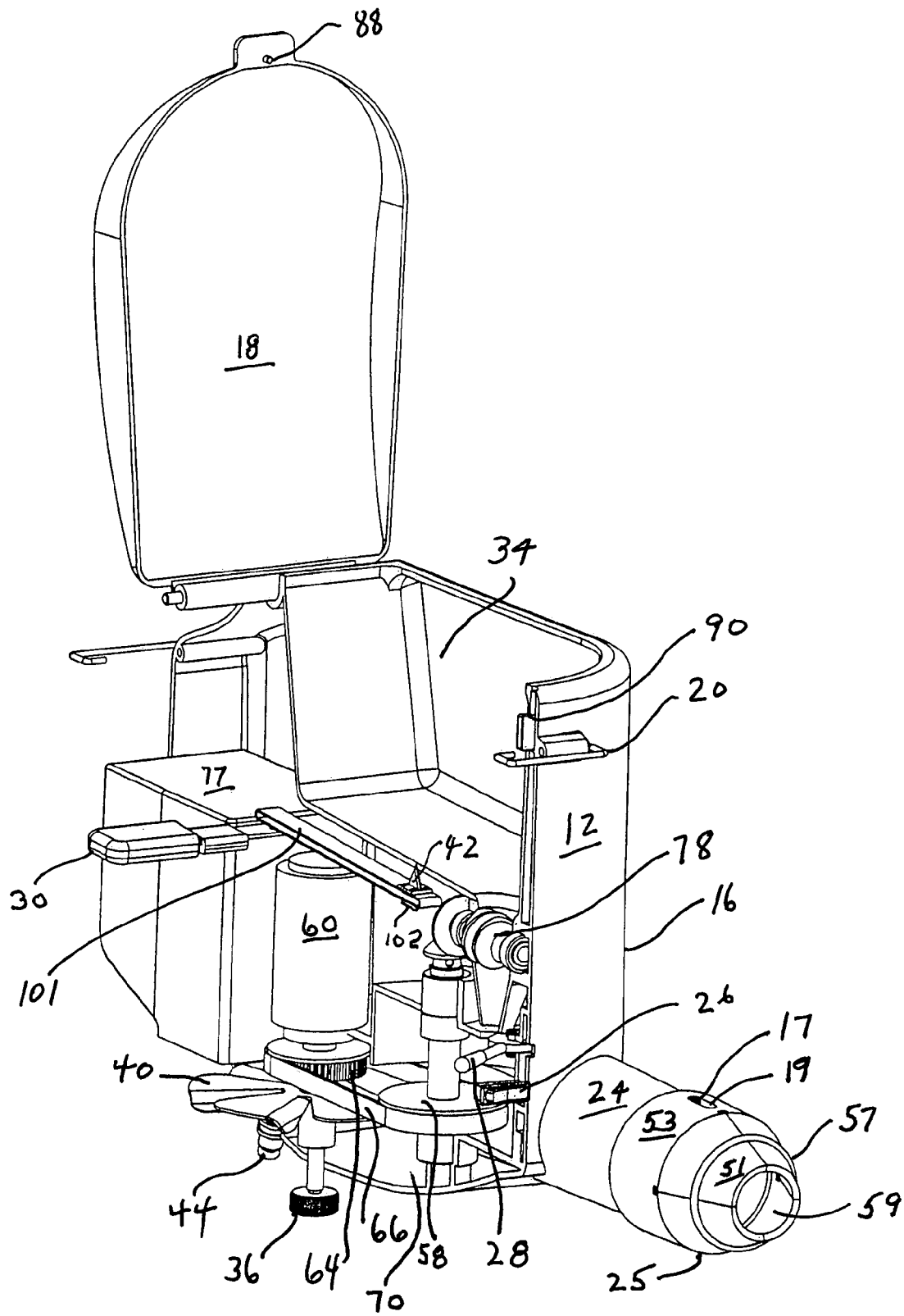
FIG. 4 is a top right side perspective view similar to FIG. 3 for depicting certain additional constructional details, the portable spreader/blower being shown at a slight counter clockwise disposition to that of FIG. 3, again the centrifugal distributing disk being omitted from the view.

With continuing reference now to FIGS. 3-5, storage bin 34 which has tapered walls as at 103 to enhance particulate downflow to a bin outlet location, is provided with an outlet in the bottom thereof as at 46 so that salt material can gravity feed out of the bin and onto a face area of centrifugal distributor disk 48 for purpose and in manner as is described next.

A material flow guide tube 50 which can be configured as a funnel extends downwardly from the bin bottom outlet 46 a distance to a termination thereof just above a top of the face 52 of distributor disk 48. Distributor disk 48 also has a series of circularly spaced vanes 54 upstanding from the face 52. With this arrangement, material down feeding from the bin 34 falls onto the disk face 52. The Distributor disk 48 is rotatably mounted in the housing on drive shaft 56. Drive shaft 56 in turn is mounted to a driven pulley 58. A D. C. electric drive motor 60 mounted in the housing includes an output driver shaft 62 to which is fixed a driver pulley 64, the electric motor being powered with a rechargeable, heavy duty type battery 77. A drive belt 66 is mounted around pulleys 64 and 58. A recharging plug 106 (FIG. 5) is carried at the rear underside of the housing for connecting a recharging line used for recharging the battery 77.

Referring to FIGS. 3 and 4, the bottom outlet of flow guide tube 50 can be closed off to a closure condition of zero closure to a full closure or an intermediate degree of closure between zero and full closure. For such controlling purpose, a pivoting plate 96 is supported for movement at the bottom of the flow guide tube. Its movement is in close spacing to the opening at the guide tube bottom so that as seen in FIG. 4, where the plate 96 closes off the guide tube bottom opening, no material can pass from the guide tube onto the distributor disk. On the other hand, plate 96 can be pivoted with control lever 28 to move plate 96 clear of the guide tube bottom and material is free to pass from the guide tube onto the distributor disk face 52. Preferably, plate 96 will have in addition to full closed and full open positions, at least one but more preferably plural intermediate closure positions.

Figure 6:
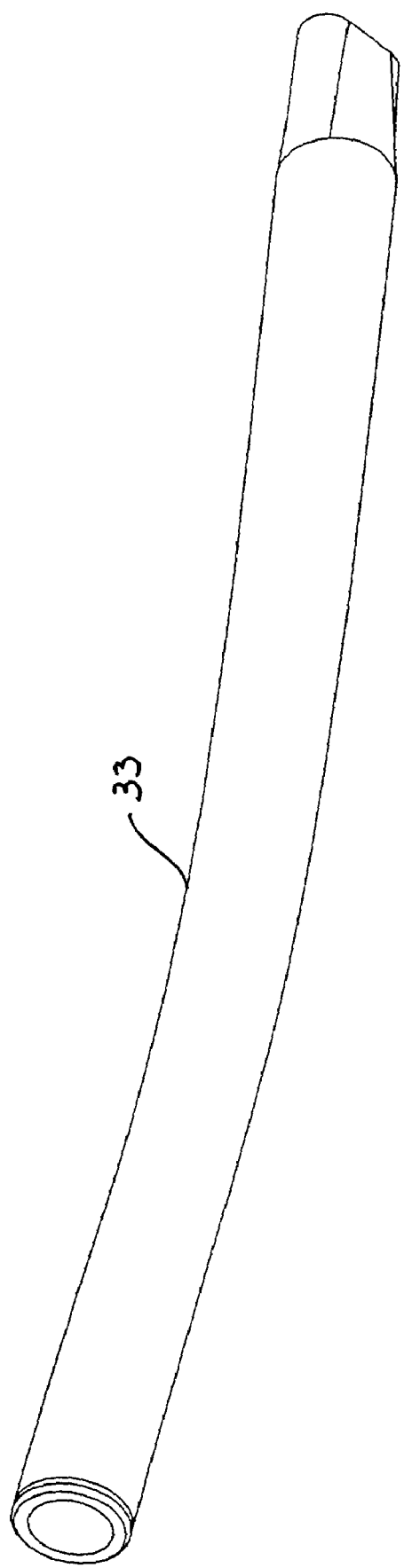
FIG. 6 is a perspective view of a nozzle extension piece which can be fitted to the portable spreader/blower discharge nozzle to allow altering flow direction course of the salt being discharged, as well as to direct airstream flow to otherwise hard to access areas requiring, e.g. salt spread thereon or leaves to be blown therefrom.

FIG. 6 shows a flexible hose nozzle extension piece 33 which, as described earlier herein, can be removably fitted with a snap fit to the discharge nozzle 25 to give a user greater flexibility in directing spreader salt discharge over a range of ground areas without having to turn the spreader unit itself or his body in a direction of any given ground area to effect material delivery thereto.

A shroud 68 overlays and encloses a rear part and some of a front part of the distributor disk 48. This is for two reasons. First, the front part of the disk is left open to allow the outlet of the flow guide tube to drop onto the disk face and, two, to establish communication of the shrouded space of the disk with the discharge tube 24 and discharge nozzle 25 via open space areas 70 in the housing and which lead to discharge tube 24 (FIGS. 3 and 5). When the drive motor operates, the distributor disk 48 is thereby driven at a high speed so that salt falling onto the disk is impelled from the disk at high speed.

With particular reference to FIG. 5, clutch unit 38 is seen located beneath fan impeller 40, the clutch being engaged control knob 36 to produce drive of the fan impeller from the motor rotary drive shaft 62. The fan impeller 40 produces a high speed airstream flow which accesses open space areas 70 and adds to the momentum with which the salt material is discharged outwardly of the housing. Use of the airstream flow as an aid to material discharge is optional as for many situations, distributor disk high speed rotation is sufficient to produce required material throw.

With further reference to FIGS. 4 and 5, A material crusher such as rotary screw crusher 78 supported bearings 85 and 87 is disposed in an upper part of the flow guide tube 50, so that any agglomerated mass of salt discharging from the storage bin 34 which be comminuted to small particle size A bevel drive pinion 80 at the top of drive shaft 56 is drivingly engaged with a driven bevel pinion 83 at an end of the screw crusher 78 to provide drive of the crusher.

As best seen in FIGS. 4 and 5, the housing is provided with the cooperating components 88, 90 of a cut off switch which prevents operation of the spreader/blower whenever cover 18 is open.

Referring to FIG. 9, bin vibrating means 151 is provided to effect a certain magnitude of vibratory movement of the bin base 153, and to adjacent bin walls 155, 157. The effect of the vibration of the bin structure is to transfer energy to the particulate material particles causing them to move so that agglomeration of the particles is deterred. Clumping of the particulates as would prevent feeding of particulates to the bin outlet aperture to maintain a feed of material to the distributor disk and ultimate discharge to areas being treated is prevented. A stub shaft 161 can be fitted to driven bevel gear 83. An eccentric cam 163 is fixed to stub shaft 161 and during each rotation of the stub shaft, the cam 163 will have a momentary engagement with a wear plate 165 fitted to the bottom of bin base 153. Such engagement produces a vibration in the bin base and at least parts of walls 155, 157 effective to insure particulate material feed from the bin to the distributor disk 48. The base and side walls of the bin can be cushioned with, e.g., rubber or foam to minimize vibration effect in other parts of the housing.

Having described preferred embodiments of the invention with reference to the accompanying drawings, it is to be understood that the invention id not limited to these precise embodiments, and that various changes and modifications may be effected therein by one skilled in the art without departing from the scope or spirit of the invention as defined in the appended claims.

What is claimed is:

1. A portable spreader/blower comprising:
a housing enclosure, the housing enclosure including a bin therein for holding material to be spread, the housing enclosure further having a discharge nozzle thereon;
a centrifugal distributor disk rotatably mounted in said housing enclosure in an enclosure space region below said bin, the bin having an outflow aperture located therein above a face part of said distributor disk so that material discharging from said bin through said outflow aperture falls onto said distributor disk face part;
a material flow guide tube extending downwardly from said bin outflow aperture to a location proximal the face part of said distributor disk;
a rotary screw crushing means for crushing any agglomerated material mass present in outflow thereof from said bin;
a closure member operable to selectively alter an effective bin outflow aperture size from between a zero opening size to a full opening size;
means for rotating said distributor disk; and
a shroud encasing said distributor disk, said shroud having an outlet in communication with said discharge nozzle so that material falling onto said rotating distributor disk face part is propelled by said distributor disk out of said housing enclosure through said discharge nozzle.

2. A portable spreader/blower in accordance with claim 1, in which said flow guide tube is configured as a funnel tapering inwardly in a direction of said distributor disk.

3. A portable spreader/blower in accordance with claim 2, in which said crushing means is disposed at an entry section length of said flow guide tube within said guide tube.

4. A portable spreader/blower in accordance with claim 1, in which said closure member is a sliding plate movable between full material outflow and no material outflow positions and at any others of plural selected positions between said full outflow and no outflow positions, said sliding plate being disposed at a lower end of said flow guide tube.

5. A portable spreader/blower in accordance with claim 1, further comprising a slitter member slidably mounted in said housing and including a knife member for slitting open a container package of material received in said bin thereby to release said material for outflow into said bin.

6. A portable spreader/blower in accordance with claim 1, further comprising a supporting belt receivable pair of clips carried at respective front and rear ends of said housing.

7. A portable spreader/blower in accordance with claim 1, wherein said housing enclosure includes a cover overlaying said bin, said cover being hinge connected to said housing for movement between cover open and closed positions.

8. A portable spreader/blower in accordance with claim 7, further comprising a switch actuatable by movement of said cover to open position for disabling said means for rotating said distributor disk.

9. A portable spreader/blower in accordance with claim 1, further comprising a nozzle extension piece removably connectable to said nozzle.

10. A portable spreader/blower in accordance with claim 9, further comprising cooperating connection means carried on said nozzle and said extension piece for connecting said extension piece with said nozzle.

11. A portable spreader/blower in accordance with claim 1, further comprising vibration means for vibrating at parts of a bin base and side walls connected to said base, thereby to produce movement of material in the bin toward said bin outflow aperture.

12. A portable spreader/blower comprising:
- a housing enclosure, the housing enclosure including a bin therein for holding material to be spread, the housing enclosure further having a discharge nozzle thereon;
- a centrifugal distributor disk rotatably mounted in said housing enclosure in an enclosure space region below said bin, the bin having an outflow aperture located therein above a face part of said distributor disk so that material discharging from said bin through said outflow aperture falls onto said distributor disk face part;
- a closure member operable to selectively alter an effective bin outflow aperture size from between zero opening size to a full opening size;
- means for rotating said distributor disk;
- a shroud encasing said distributor disk, said shroud having an outlet in communication with said discharge nozzle so that material falling onto said rotating distributor disk face is propelled by said distributor disk out of said housing enclosure through said discharge nozzle;
- a fan blade rotatably mounted in said housing enclosure in said enclosure space region; and
- means for rotating said fan blade to produce an airstream flow in said enclosure space region, said enclosure space region being in communication with said discharge nozzle whereby said airstream flows outwardly from said in company with any material propelled by said distributor disk.

13. A portable spreader/blower in accordance with claim 12, in which the means for rotating said distributor disk and the means for rotating said fan blade derive driving power from a common drive source.

14. A portable spreader/blower in accordance with claim 12, further comprising a clutch unit for engaging and disengaging said fan blade rotating means with said common drive source.

15. A portable spreader/blower in accordance with claim 12, wherein said common drive source includes an electric drive motor.

16. A portable spreader/blower in accordance with claim 12, further comprising material crushing means for crushing any agglomerated mass of material present in outflow thereof from said bin.

17. A portable spreader/blower comprising:
- a housing enclosure, the housing enclosure including a bin therein for holding material to be spread, the housing enclosure further having a discharge nozzle thereon;
- a centrifugal distributor disk rotatably mounted in said housing enclosure in an enclosure space region below said bin, the bin having an outflow aperture located therein above a face part of said distributor disk so that material discharging from said bin through said outflow aperture falls onto said distributor disk face part;
- a closure member operable to selectively alter an effective bin outflow aperture size from between zero opening size to a full opening size;
- means for rotating said distributor disk;
- a shroud encasing said distributor disk, said shroud having an outlet in communication with said discharge nozzle so that material falling onto said rotating disk face part is propelled by said distributor disk out of said housing enclosure through said discharge nozzle; and
- a quick connect fitting carried in said housing for connecting an airstream flow course in said housing with an outside source of high pressure air.

18. A portable spreader/blower comprising:
- a housing enclosure, the housing enclosure including a bin therein for holding material to be spread, the housing enclosure further having a discharge nozzle thereon;
- a centrifugal distributor disk rotatably mounted in said housing enclosure in an enclosure space region below said bin, the bin having an outflow aperture located therein above a face part of said distributor disk so that material discharging from said bin through said ouflow aperture falls onto said distributor disk face part;
- a closure member operable to selectively alter an effective bin outflow aperture size from between a zero opening size to a full opening size;
- means for rotating said distributor disk; and
- a shroud encasing said distributor disk, said shroud having an outlet in communication with said discharge nozzle so that material falling onto said rotating distributor disk face part is propelled by said distributor disk out of said housing enclosure through said discharge nozzle,
- said nozzle having an adjustable nozzle orifice to correspondingly adjust velocity of an airstream issuing from said nozzle.

* * * * *